(12) United States Patent
Kobayashi et al.

(10) Patent No.: US 7,032,484 B2
(45) Date of Patent: Apr. 25, 2006

(54) MACHINE TOOL ASSEMBLY

(75) Inventors: Takeo Kobayashi, Ueda (JP); Sakae Nakazawa, Ueda (JP)

(73) Assignee: Miyano Machinery Japan, Inc., Nagano (JP)

( * ) Notice: Subject to any disclaimer, the term of this patent is extended or adjusted under 35 U.S.C. 154(b) by 0 days.

(21) Appl. No.: 10/475,557

(22) PCT Filed: Mar. 18, 2003

(86) PCT No.: PCT/IB03/03091

§ 371 (c)(1),
(2), (4) Date: Jun. 7, 2004

(87) PCT Pub. No.: WO03/084711

PCT Pub. Date: Oct. 16, 2003

(65) Prior Publication Data

US 2004/0211301 A1    Oct. 28, 2004

(30) Foreign Application Priority Data

Mar. 18, 2002  (JP) .............................. 2002-074977
Oct. 15, 2002  (JP) .............................. 2002-300200

(51) Int. Cl.
    *B23B 3/34*    (2006.01)
(52) U.S. Cl. .............................. 82/129; 82/117; 82/121
(58) Field of Classification Search .................. 82/117, 82/121, 122, 123, 129, 142, 148, 149, 157; 29/35.5, 36, 40, 50
See application file for complete search history.

(56) References Cited

U.S. PATENT DOCUMENTS 5,787,560 A    8/1998  Schalles 5,921,159 A  *  7/1999  Watkins ........................ 82/159

(Continued)

FOREIGN PATENT DOCUMENTS

DE    3320940 A    12/1984

(Continued)

Primary Examiner—Willmon Fridie, Jr.
(74) Attorney, Agent, or Firm—Wood, Phillips, Katz, Clark & Mortimer

(57) ABSTRACT

A machine tool assembly having a base assembly movable relative to a support selectively a) oppositely parallel to a first line, and b) oppositely parallel to a second line that is orthogonal to the first line, and a first spindle headstock movable with the base assembly and having a central axis extending parallel to the first line and a working end. The machine tool assembly further includes a first turret assembly movable with the base assembly and having a first turret headstock and a first turret head that is movable around a first axis relative to the first turret headstock. The first turret head is movable selectively into first and second different angular positions around the first axis relative to the first turret headstock. The first turret head and first spindle headstock are movable relative to each other parallel to the first line in a manner that the first turret head can move up to and past the working end of the first spindle headstock without interference between the first spindle headstock and first turret assembly with the first turret assembly and first spindle headstock in a first relative state. The first turret assembly and first spindle headstock interfere with each other as the first turret assembly and first spindle headstock are moved relative to each other parallel to the first line in a manner that the first turret head moves up to the working end of the first spindle headstock with the first turret assembly and first spindle headstock in a second relative state.

43 Claims, 12 Drawing Sheets

U.S. PATENT DOCUMENTS 6,626,075 B1 * 9/2003 Hirose et al. .................. 82/118
6,640,677 B1 * 11/2003 Ueda et al. ................... 82/129

FOREIGN PATENT DOCUMENTS

| | | | |
|---|---|---|---|
| DE | 3626324 A | 2/1988 |
| DE | 3803219 A | 8/1989 |
| DE | 3844835 C | 10/2001 |
| EP | 0331003 A | 9/1989 |
| EP | 0573678 A | 12/1993 |
| EP | 1048380 A | 11/2000 |

* cited by examiner

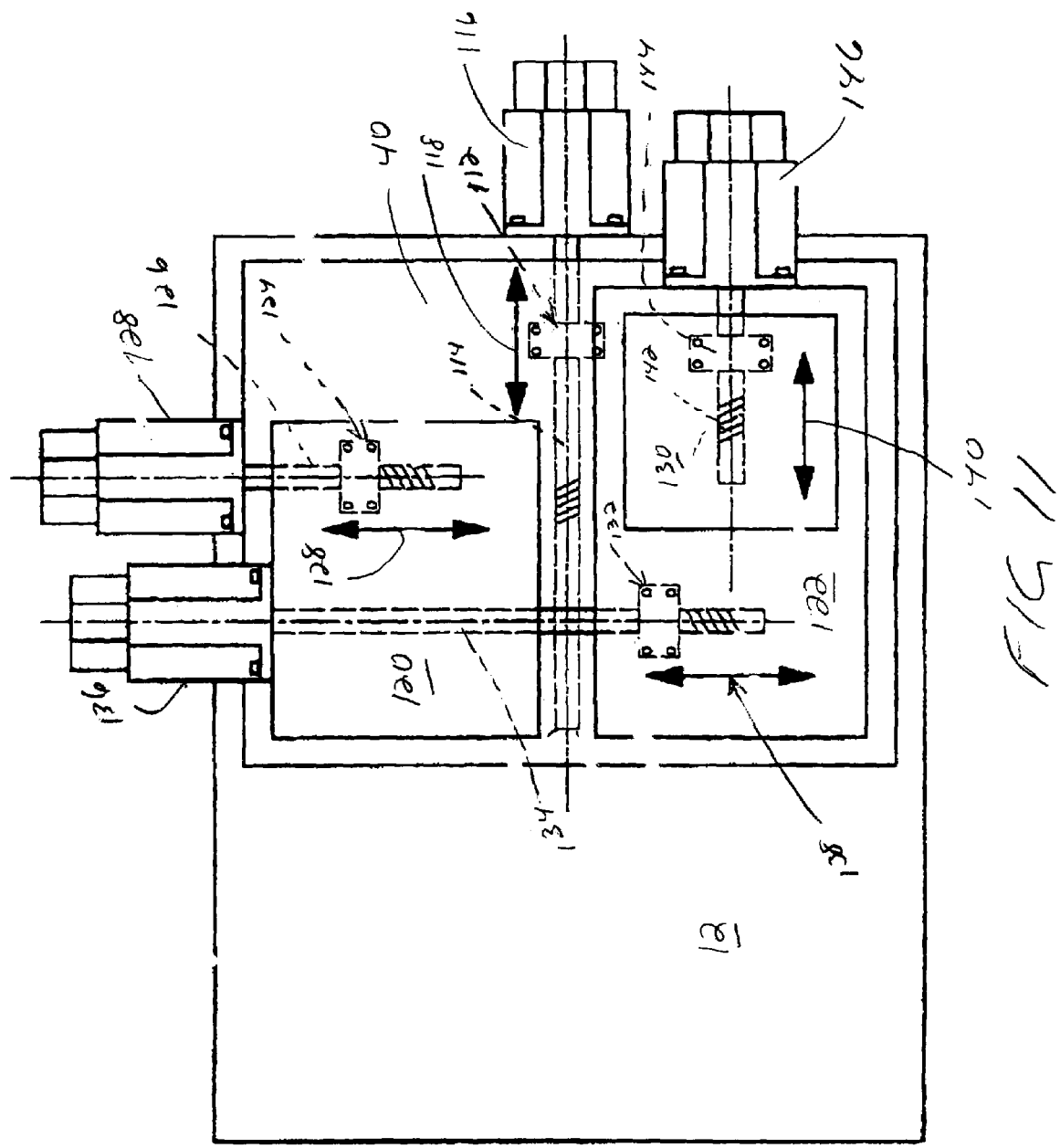

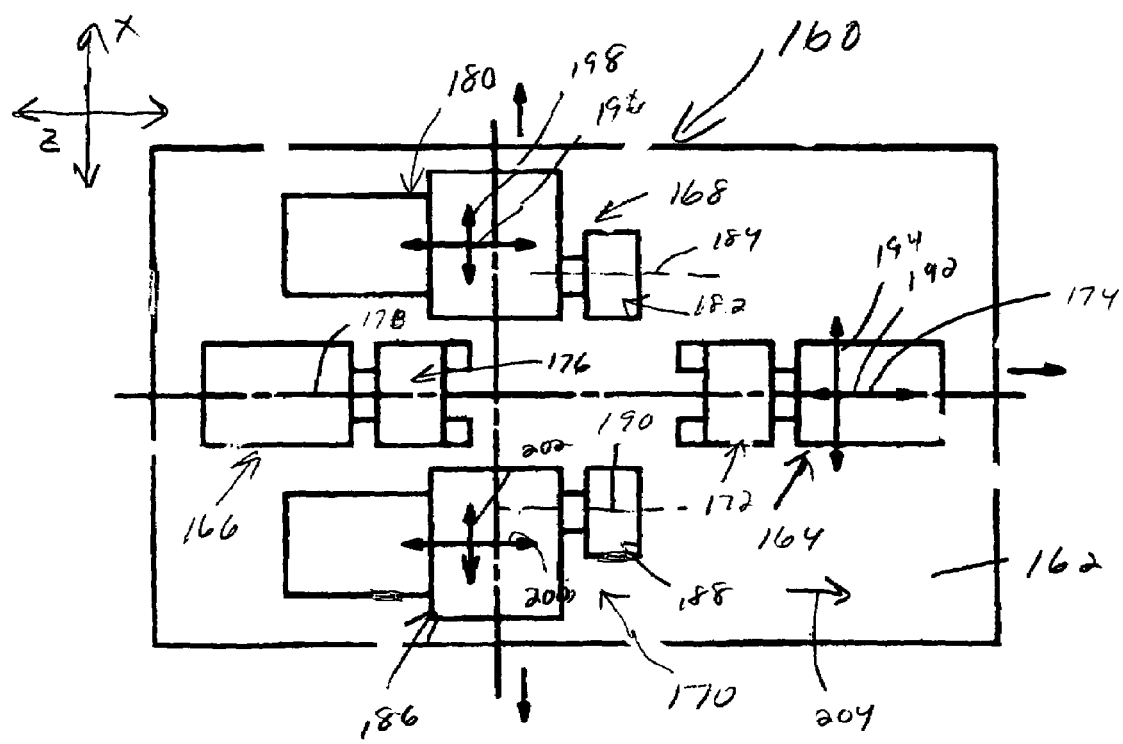

MACHINE TOOL ASSEMBLY

BACKGROUND OF THE INVENTION

1. Field of the Invention

This invention relates to machine tools and, more particularly, to a machine tool having a spindle headstock that cooperates with a tool turret assembly in processing workpieces.

2. Background Art

In the machine tool industry, one common machine tool configuration employs two independent machining assemblies, each having a spindle headstock and one or more tool turret assemblies. Essentially, these designs function in certain respects as to two independent machining units to provide the required system flexibility and efficiency. Variations have been introduced into the industry to make these systems even more efficient and flexible. Generally, these improved systems incorporate additional components which make more complex the coordination of movement of system components to provide the desired efficiency and flexibility without interference and potential collision between the components.

An exemplary prior art machining system, over which the present invention improves, is shown at 160 in FIG. 12. The machining system 160 consists of a support 162 upon which the system components are mounted. The system components consist of a first spindle headstock 164, a second spindle headstock 166, a first tool turret assembly 168, and a second tool turret assembly 170. The first spindle headstock 164 includes a spindle 172 which is rotatable around a central axis 174. The spindle 172 is capable of chucking a workpiece and rotating the same around the central axis 174. The second spindle headstock 166 likewise has a spindle 176 to chuck a workpiece and rotate the same around a central axis 178 for the second spindle headstock 166.

The first tool turret assembly 168 consists of a first turret headstock 180 to which a first turret head 182 is mounted for pivoting around an axis 184. The second tool turret assembly consists of a second turret headstock 186 which mounts a second turret head 188 for pivoting movement about an axis 190. The first and second turret heads 182, 188 each carry a plurality of tool holders/tools that can be selectively indexed to an operative/active position.

The second spindle headstock 166 is fixed to the support 162. The first spindle headstock 164 is translatable selectively oppositely along a first line, parallel to a Z-coordinate axis and an orthogonal second line, parallel to an X-coordinate axis, as indicated by the double-headed arrows 192, 194, respectively. Similar movement is allowed along the first and second lines, as indicated by the double-headed arrows 196, 198 for the first tool turret assembly 168, with like arrows 200, 202 indicating the same translatory movement for the second tool turret assembly 170.

The spindles headstocks 164, 166 face towards each other, with the former facing in a first direction. Because the spindles 172, 176 are movable towards each other along the first line/Z-axis, it is possible to compact the system along the first line/Z axis. The first and second turret heads 182, 198 face opposite to the first direction along the first line, as indicated by the arrow 204. With this arrangement, the first and second turret heads 182, 188 can be advanced along the first line/Z-axis opposite to the first direction, as indicated by the arrow 204, towards the spindle 172.

With the machining system 160, outer diameter machining can be performed on a workpiece chucked by the spindle 176 by tools held by one or both of the first and second turret heads 182, 188.

Additionally, backside processing can be performed on a workpiece chucked by the spindle 172 at the same time front side processing is performed on a workpiece held by the spindle 176, using separate tools held by the first and second turret heads 182, 188.

Additionally, after finishing the front side processing of a workpiece held by the spindle 176, the same workpiece can be transferred to the spindle 172 to allow performance of backside processing thereon. This potentially shortens the overall processing cycle.

Because of the absence of a tool turret assembly in association with the first spindle headstock 164, inside diameter processing utilizing the advancing movement of this turret assembly cannot be performed on either a workpiece chucked by the spindle 176 or a workpiece chucked by the spindle 172.

Additionally, center axis chattering may be caused by a center-holding subspindle which center supports the front side of a workpiece which is chucked by the spindle 172. This introduces the need for another tool turret assembly in association with the first spindle headstock 164. This can be accomplished by incorporating a third tool turret assembly (not shown) that is capable of moving along the first line/Z-axis, and second line/X-axis independently of the first spindle headstock 164.

However, incorporating an independent third spindle assembly, as described above, potentially introduces significantly increased costs and may result in a complicated mechanical system with potentially complicated and difficult coordination of movement between the multiple components.

SUMMARY OF THE INVENTION

In one form, the invention is directed to a machine tool assembly having a base assembly movable relative to a support selectively a) oppositely parallel to a first line, and b) oppositely parallel to a second line that is orthogonal to the first line, and a first spindle headstock movable with the base assembly and having a central axis extending parallel to the first line and a working end. The machine tool assembly further includes a first turret assembly movable with the base assembly and having a first turret headstock and a first turret head that is movable around a first axis relative to the first turret headstock. The first turret head is movable selectively into first and second different angular positions around the first axis relative to the first turret headstock. The first turret head and first spindle headstock are movable relative to each other parallel to the first line in a manner that the first turret head can move up to and past the working end of the first spindle headstock without interference between the first spindle headstock and first turret assembly with the first turret assembly and first spindle headstock in a first relative state. The first turret assembly and first spindle headstock interfere with each other as the first turret assembly and first spindle headstock are moved relative to each other parallel to the first line in a manner that the first turret head moves up to the working end of the first spindle headstock with the first turret assembly and first spindle headstock in a second relative state.

In one form, with the first turret assembly and first spindle headstock in the first relative state, the first turret head is in the first angular position, and with the first turret assembly and first spindle headstock in the second relative state, the first turret head is in the second angular position.

In one form, the central axis of the first spindle headstock is spaced further from the first axis with the first turret assembly and first spindle headstock in the first relative state than with the first turret assembly and first spindle headstock in the second relative state.

In one form, the first turret head projects a first distance from the first axis toward the first spindle headstock with the first turret head in the first angular position and the first turret head projects a second distance from the first axis toward the first spindle headstock with the first turret head in the second angular position, and the first distance is less than the second distance.

In one form, the base has a base frame which is movable on one piece parallel to the first and second lines. The first turret headstock is fixedly attached to the base frame and the first spindle headstock is mounted to the base frame for movement relative to the base frame parallel to the first line.

In one form, the first turret head has an outer circumference from which a plurality of circumferentially spaced tools project and the first turret head has a circumferential void between adjacent tools defining a receptacle to accommodate at least a part of the first spindle headstock.

In one form, the first turret head is generally V-shaped as viewed from a perspective along the first axis.

In one form, the first turret head is generally V-shaped opening away from an apex as viewed from a perspective along the first axis, and the apex is adjacent to the first axis.

In one form, the first axis resides within the V defined by the V-shaped first turret head.

In one form, the first spindle headstock and first turret head are movable selectively toward and away from each other parallel to the first line.

In one form, the first spindle headstock and first turret headstock are movable selectively toward and away from each other parallel to the second line.

In one form, with the first turret head and working end of the first spindle headstock overlapping along the first line, the first spindle headstock and first turret headstock can be moved closer to each other parallel to the second line with the first turret head in the first angular position than with the first turret head in the second angular position.

The machine tool assembly may further include a second spindle headstock and a second turret assembly. The second spindle headstock has a central axis extending parallel to the first line, the first spindle headstock faces a first direction along the central axis of the first spindle headstock, with the second spindle headstock facing oppositely to the first direction along the central axis of the second spindle headstock, The first and second spindle headstocks face each other. The second turret assembly has a second turret headstock and a second turret head. The second turret head faces oppositely to the first direction and is movable selectively oppositely parallel to the first and second lines. The first turret head faces in the first direction. The base assembly is spaced from the second spindle headstock in a direction oppositely to the first direction.

In one form, with the first turret assembly and first spindle headstock in the first relative state, the first turret head is in the first angular position, and with the first turret assembly and first spindle headstock in the second relative state, the first turret head is in the second angular position.

In one form, the central axis of the first spindle headstock is spaced further from the first axis with the first turret assembly and first spindle headstock in the first relative state than with the first turret assembly and first spindle headstock in the second relative state.

In one form, the first turret head projects a first distance from the first axis toward the first spindle headstock with the first turret head in the first angular position and a second distance from the first axis toward the first spindle headstock with the first turret head in the second angular position, with the first distance being less than the second distance.

In one form, the base assembly has a base frame which is movable as one piece parallel to the first and second lines. The first turret headstock is fixedly attached to the base frame. The first spindle headstock is mounted to the base frame for movement relative to the base frame parallel to the first line.

In one form, the first turret head has an outer circumference from which a plurality of circumferentially spaced tools project and the first turret head has a circumferential void between adjacent tools defining a receptacle to accommodate at least a part of the first spindle headstock.

In one form, the first turret head is generally V-shaped as viewed from a perspective along the first axis.

In one form, the first turret head is generally V-shaped opening away from an apex as viewed from a perspective along the first axis, and the apex is adjacent to the first axis.

In one form, the first axis resides within the V defined by the V-shaped first turret head.

In one form, the first spindle headstock and first turret head are movable selectively toward and away from each other parallel to the second line.

In one form, the first spindle headstock and first turret headstock are movable selectively toward and away from each other parallel to the first line.

In one form, with the first turret head and working end of the first spindle headstock overlapping along the first line, the first spindle headstock and first turret headstock can be moved closer to each other parallel to the second line with the first turret head in the first angular position than with the first turret head in the second angular position.

In one form, the second turret head is movable around a second axis relative to the second turret headstock. The machine tool assembly further has a third turret assembly including a third turret headstock and a third turret head. The third turret head is movable around a third axis relative to the third headstock. The central axis of the second spindle headstock resides between the second and third axes.

In one form, with the first turret assembly and first spindle headstock in the first relative state, the first turret head is in the first angular position, and with the first turret assembly and first spindle headstock in the second relative state, the first turret head is in the second angular position.

In one form, the central axis of the first spindle headstock is spaced further from the first axis with the first turret assembly and first spindle headstock in the first relative state than with the first turret assembly and first spindle headstock in the second relative state.

In one form, the third turret headstock is selectively movable oppositely parallel to the first and second lines.

In one form, the third turret headstock faces oppositely to the first direction.

In one form, the first turret head projects a first distance from the first axis toward the first spindle headstock with the first turret head in the first angular position and projects a second distance from the first axis toward the first spindle headstock with the first turret head in the second angular position, with the first distance being less than the second distance.

In one form, the base assembly includes a base frame which is movable as one piece parallel to the first and second lines. The first turret headstock is fixedly attached to the base frame. The first spindle headstock is mounted to the base frame for movement relative to the base frame parallel to the first line.

In one form, the first turret head has an outer circumference from which a plurality of circumferentially spaced tools project and the first turret head has a circumferential void between adjacent tools defining a receptacle to accommodate at least a part of the first spindle head stock.

In one form, the first turret head is generally V-shaped as viewed from a perspective along the first axis.

In one form, the first turret head is generally V-shaped opening away from an apex as viewed from a perspective along the first axis and the apex is adjacent to the first axis.

In one form, the first axis resides within the V defined by the V-shaped first turret head.

In one form, the first spindle headstock and first turret head are movable selectively toward and away from each other parallel to the second line.

In one form, the first spindle headstock and first turret head stock are movable selectively toward and away from each other parallel to the first line.

In one form, with the first turret head and working end of the first spindle headstock overlapping along the first line, the first spindle headstock and first turret headstock can be moved closer to each other parallel to the second line with the first turret head in the first angular position than with the first turret head in the second angular position.

The invention is also directed to a turret assembly having a turret headstock and a turret head that is movable guidingly relative to the turret headstock around an axis. The turret head defines a receptacle into which a machine tool component can be radially directed relative to the axis.

In one form, the turret head has an outer circumference from which a plurality of circumferentially spaced tools project and the turret head has a circumferential void between adjacent tools defining the receptacle.

In one form, the turret head is generally V-shaped as viewed from a perspective along the axis.

In one form, the turret head is generally V-shaped opening away from an apex as viewed from a perspective along the axis and the apex is adjacent to the axis.

In one form, the axis resides within the V defined by the V-shaped turret head.

In one form, the turret assembly is provided in combination with a spindle headstock capable of holding a workpiece to be processed by a tool held by the turret head, and the spindle headstock and turret head are relatively movable between a state wherein the spindle headstock resides at least partially within the receptacle and a state wherein the spindle headstock does not reside within the receptacle.

BRIEF DESCRIPTION OF THE DRAWINGS

FIG. 11 is a partially schematic, plan view of a mechanism for controlling relative movement between the first spindle head stock and first turret assembly as shown in FIGS. 8 and 9; and FIG. 12 is a schematic, plan view of a conventional machine tool over which the present invention improves.

DETAILED DESCRIPTION OF THE DRAWINGS

Figure 1:
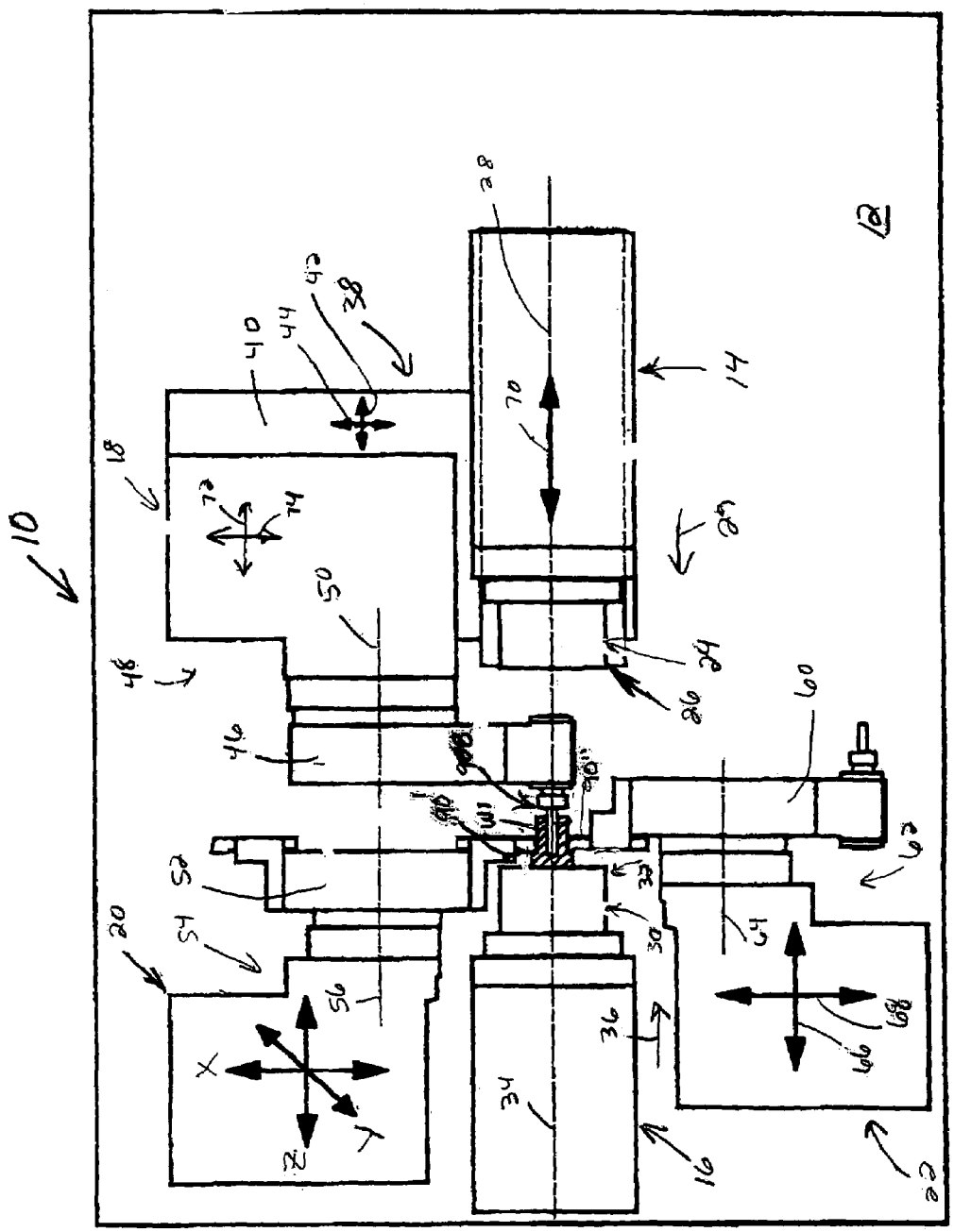
FIG. 1 is a partially schematic, plan view of a machine tool, according to the present invention, and including a combination first spindle headstock and first turret assembly, a second spindle headstock, and independent second and third turret assemblies in a first configuration for performing a processing operation upon a workpiece.

In FIG. 1, one form of machine tool, according to the present invention, is shown at 10. The components of the machine tool 10 are mounted upon a common support 12. The machine tool components consist of a first spindle headstock 14, a second spindle headstock 16, a first turret headstock 18, a second turret headstock 20, and a third turret headstock 22. The mounting positions and relative movements of the machine tool components 14, 16, 18, 20, 22 is described relative to an X, Y, Z coordinate system. For a more generic description, the Z-axis will be described as a first line, with the X-axis described as a second line, orthogonal to the first line/Z-axis.

The first spindle headstock 14 has a first spindle 24 at the working end 26 of the first spindle headstock 14. The first spindle 24 is rotatable around a central axis 28. The first spindle headstock 14 faces in a first direction along the first line/Z-axis, as indicated by the arrow 29. the central axis 28 is substantially parallel to the first line/Z-axis.

The second/main spindle headstock 16 has a second spindle 30 at the working end 32 thereof that is rotatable around a central axis 34 that is parallel to the first line/Z-axis. The second spindle headstock 16 faces oppositely to the first direction, in the direction of the arrow 36. In this embodiment, the second spindle headstock 16 is fixedly mounted to the support 12.

The first turret headstock 18 is commonly mounted with the first spindle headstock 14 upon a base assembly 38. The base assembly 38 consists of a base frame 40 that is selectively movable parallel and orthogonal to the first line/Z-axis and second line/X-axis, as indicated by the double-headed arrows 42, 44, respectively. The first spindle headstock 14 and first turret headstock 18 are thus moved simultaneously with the base frame 40. A first turret head 46 is mounted to the first turret headstock 18 to define a first turret assembly at 48. The first turret head 46 is pivotably mounted relative to the first turret headstock 18 for movement around a first axis 50 that is parallel to the first line/Z-axis. The first turret headstock 18 faces in the first direction, as indicted by the arrow 29.

A second turret head 52 is mounted to the second turret headstock 20 to define a second turret assembly 54. The second turret head 52 is pivotable relative to the second turret headstock 20 for movement around a second axis 56 that is parallel to the first line/Z-axis. The second turret headstock 20 faces oppositely to the first direction i.e. in the direction of the arrow 36.

A third turret head 60 is mounted to the third turret headstock 22 to define a third turret assembly 62. The third turret head 60 is pivotable relative to the third turret headstock 22 around a third axis 64 that is parallel to the first line/Z-axis. The third headstock 22 faces in the same direction, as does the second turret headstock 20 i.e. oppositely to the first direction as indicated by the arrow 36.

The second turret headstock 22 can be translated selectively along the first line/Z-axis, second line/X-axis, and Y-axis, as seen relative to the XYZ coordinate system representation superimposed thereon. The third turret headstock 22 is translatable selectively along the first line/Z-axis, and second line/X-axis, as indicated by the double-headed arrows 66, 68, respectively. The second turret headstock 20, third turret headstock 22, and second spindle headstock 16 are relatively situated so that the central axis 34 of the second spindle headstock 16 resides between the second axis 56 and the third axis 64 on the second turret headstock 20 and third turret headstock 22, respectively. The base frame 40 is spaced opposite to the first direction from the second spindle headstock 16 i.e. to the right thereof in FIG. 1.

As explained in greater detail below, the first spindle headstock 14 is movable along the first line/Z-axis, as indicated by the double headed arrow 70 relative to the base frame 40. Optionally, the first turret headstock 18 can be translated relative to the base frame 40 and first spindle headstock 14 along one or both of the first line/Z-axis and second line/X-axis, as indicated by the double-headed arrows 72, 74.

Figure 8:
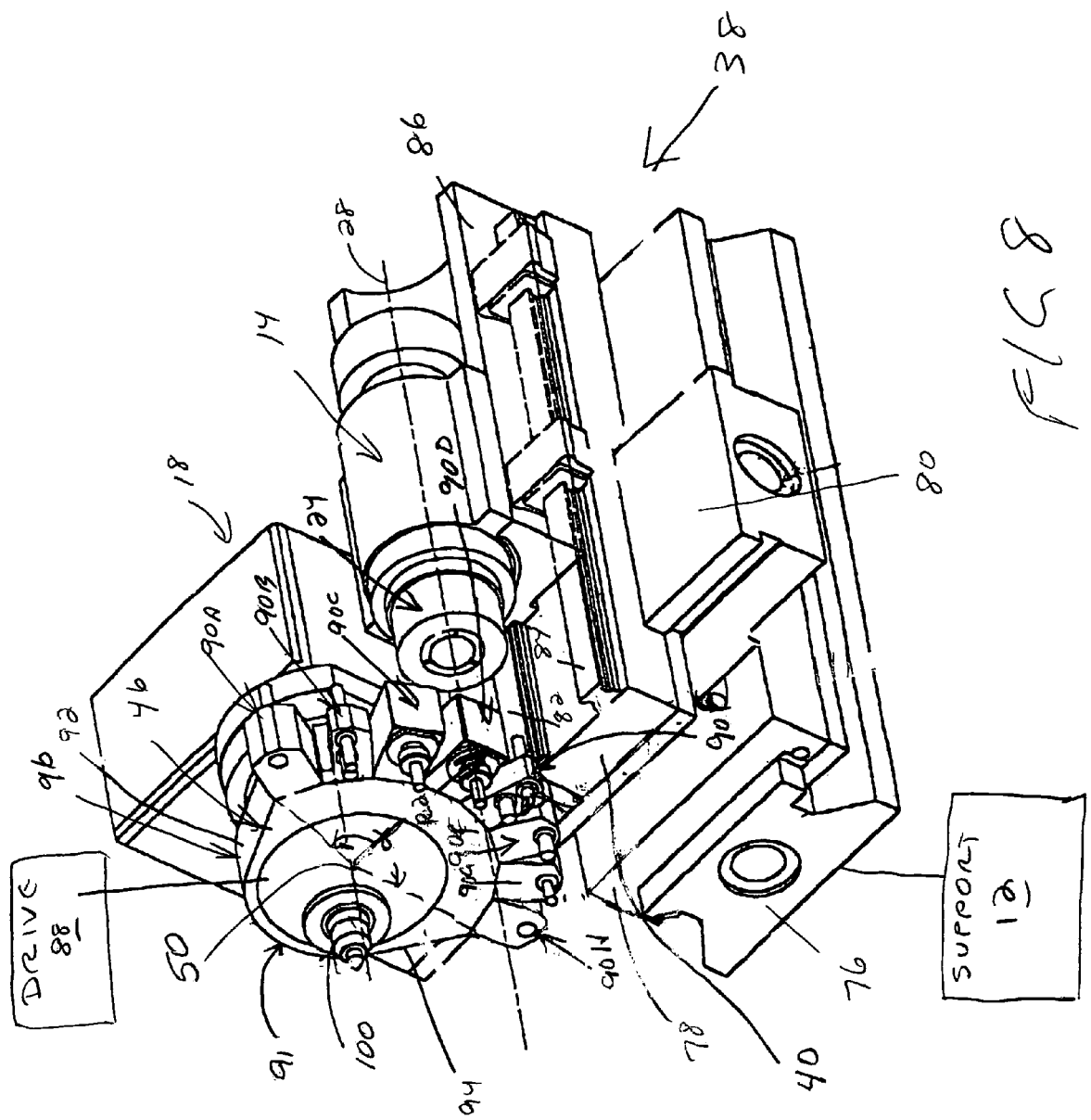
FIG. 8 is an enlarged, perspective view of the combined first spindle headstock and first turret assembly in FIGS. 1–7 and showing a turret head on the first turret assembly indexed to a first angular position as to allow processing by tools thereon as shown in FIGS. 1, 2, 5 and 6.
Figure 9:
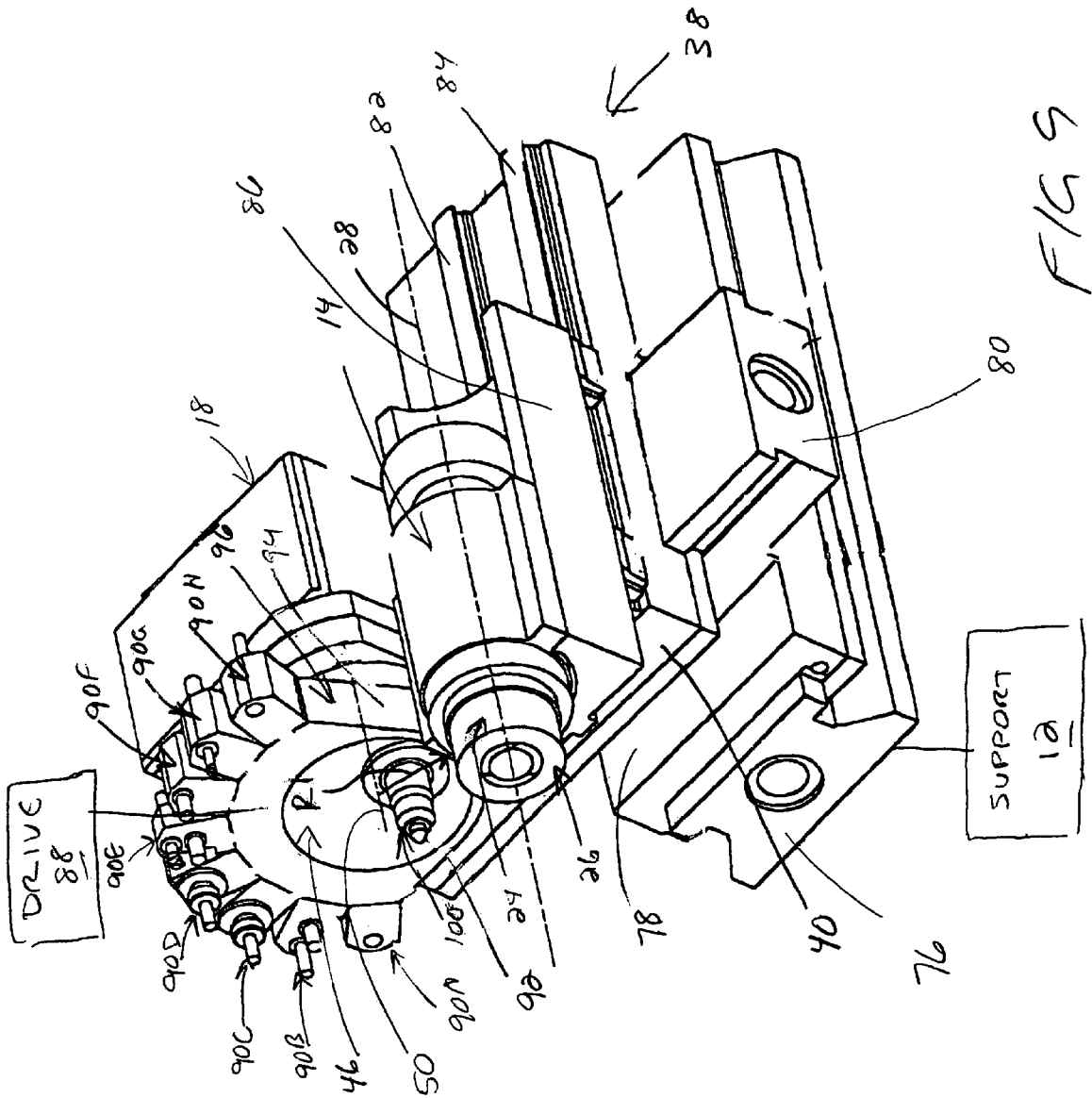
FIG. 9 is a view as in FIG. 8 with the first turret head indexed to a second angular position which allows processing by tools on the first spindle headstock as shown in FIGS. 3, 4 and 7.

Referring now to FIGS. 8 and 9, the details of the cooperation between the base assembly 38, first turret headstock 18, and first spindle headstock 14 will be described. The base assembly 38 consists of an elongate guide rail 76 which is mounted upon the support 12 and extends along the first line/Z-axis. A slide element 78 cooperates with the guide rail 76, so as to be guided thereby, along the first line/Z-axis. An elongate guide rail 80 is fixed to the slide element 78 and extends along the second line/X-axis. The base frame 40 cooperates with the guide rail 80 so as to be guided thereby along the second line/X-axis.

The first turret headstock 18 is shown fixedly attached to the base frame 40. The base frame 40 additionally supports spaced, elongate, guide rails 82, 84, which extend parallel to the first line/Z-axis. The guide rails 82, 84 cooperate with a carriage 86, that is part of the first spindle headstock 14, to guide movement of the first spindle headstock 14 along the first line/Z-axis relative to the base frame 40.

The first turret head 46, as previously mentioned, is pivotable about the first axis 50. Pivoting, indexing movement of the first turret head 46 is imparted by a drive 88.

The first turret head 46 has an outer circumference from which a plurality of circumferentially spaced tool holders/tools 90A, 90B, 90C, 90D, 90E, 90F, 90G, 90H project. The first turret head 46 has a generally V-shaped portion, as viewed along the first axis 50 with an apex at 91 and legs 92, 94 projecting angularly away from the apex 90 and substantially including the tools 90A–H. The first axis 50 resides within the "V". The tools 90A–90H extend circumferentially through an angle α measured from the axis 50 and equal to approximately 160°. The remaining circumferential extent (360°-α) defines a void at 96.

Conventionally, 12 tools/tool holders are equidistantly spaced around the circumference of a turret head. In the embodiment shown, 8 such tools/tool holders 90A–H are shown with the space for the absent, remaining 4 tools defining the void 96. The circumferential extent of the void 96 may vary substantially from that shown and will depend on a particular system configuration and desired operating characteristics. Similarly, the number of total tools/toolholders is a design consideration. For example, the void 96 may extend through a 160° circumferential angle. The purpose of the void 96, which dictates its shape, will now be described.

The first turret head 46 is indexable through the drive 88 between, among other positions, a first angular position, shown in FIG. 9, and a second angular position, as shown in FIG. 8. Actually, the first and second angular portions are each within a functionally equivalent range of angular positions. In the first angular position, the first turret head 46 projects a first radial distance R1 from the first axis 50 toward the first spindle headstock 14, as shown in FIG. 9, to allow the first turret head 46 and first spindle headstock 14 to be placed in a first relative state as shown in FIG. 9. In the second angular position, the first turret head 46 projects radially a second distance R2 from the first axis 50 toward the first spindle headstock 14, as shown in FIG. 8, to allow the first turret head 46 and first spindle headstock 14 to be placed in a second relative state, as shown in FIG. 8. The distance R1 is less than the distance R2.

As seen in FIG. 9, with the first turret head 46 in the first angular position, the void 96 functions as a receptacle to accommodate the first spindle headstock 14. The first turret head 46 is thus allowed to move, as in conjunction with the first turret headstock 18, along the first line/Z-axis from a position spaced along the first line/Z-axis to the left of the working end 26 of the first spindle 24 up to and past the first spindle 24, without interference, and into coincidence along the first line/Z-axis with the remaining portion of the first spindle headstock 14. Accordingly, the combined configuration of the first turret assembly 48 and first spindle headstock 14 can be made relatively compact along the second line/X-axis, by reducing the required spacing between the first axis 50 and the central axis 28 of the first spindle headstock 14.

By indexing the first turret head 46 to the second angular position, the active tool/toolholder 90 is extended into coincidence along the second line/X-axis with the first spindle 24.

Representative consecutive machining operations utilizing the inventive machine tool 10 will now be described with respect to FIGS. 1–7. In FIG. 1, a workpiece W1 is chucked by the second spindle 30. By turning the workpiece W1, an outer diameter processing step can be performed using a cutting tool 90' on the second turret head 52, simultaneously as an outer diameter processing step is performed by a cutting tool 90" on the third turret head 60. At the same time, the base assembly 38 can be repositioned, as from a position as in FIG. 6, to the FIG. 1 position by movement along the first line/Z-axis and continuously moved to perform differential inside diameter drilling with representative cutting tool 90B on the first turret head 46. Accordingly, the two outside diameter processing steps can be performed simultaneously as the differential inside diameter drilling is performed.

Figure 2:
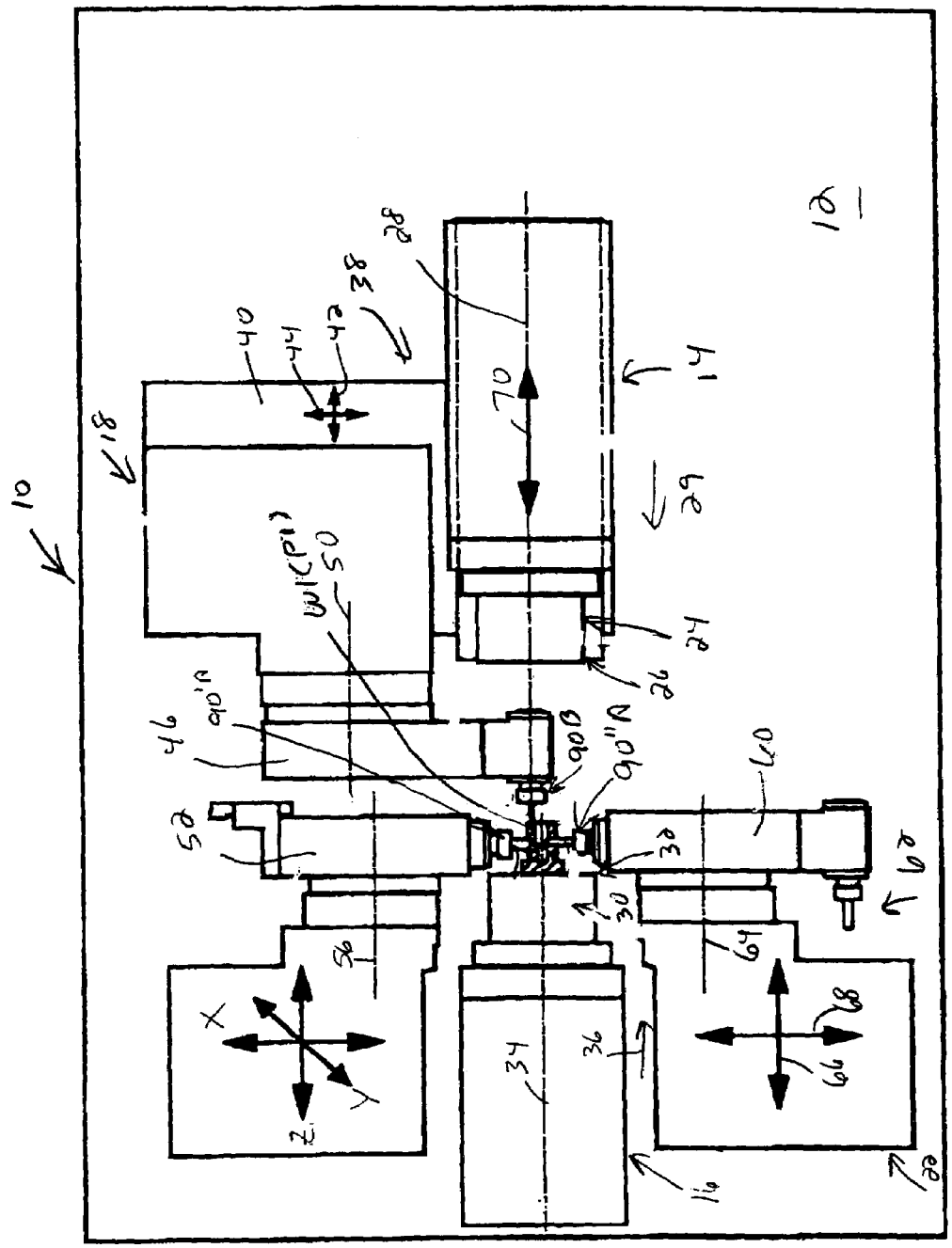
FIGS. 2–7 show progressive reconfigurations of the machine tool in FIG. 1 to perform one or more processing operations separately or simultaneously upon one or more workpieces.

The workpiece W1 is identified in FIG. 2 as W1(P1) after the processing of FIG. 1 is performed. With the workpiece W1(P1) remaining chucked by the second spindle 30, the rotation of the second spindle 30 can be halted. The second turret head 52 and third turret head 60 can be indexed to actively situate drilling tools 90'A and 90"A so as to simultaneously drill the stationary workpiece W1(P1). At the same time, the same or different tool 90B on the first turret head 46 can be operated to perform a face drilling operation on the stationary workpiece W1(P1). All three drilling operations can thus be performed simultaneously on the workpiece W1(P1).

Figure 3:
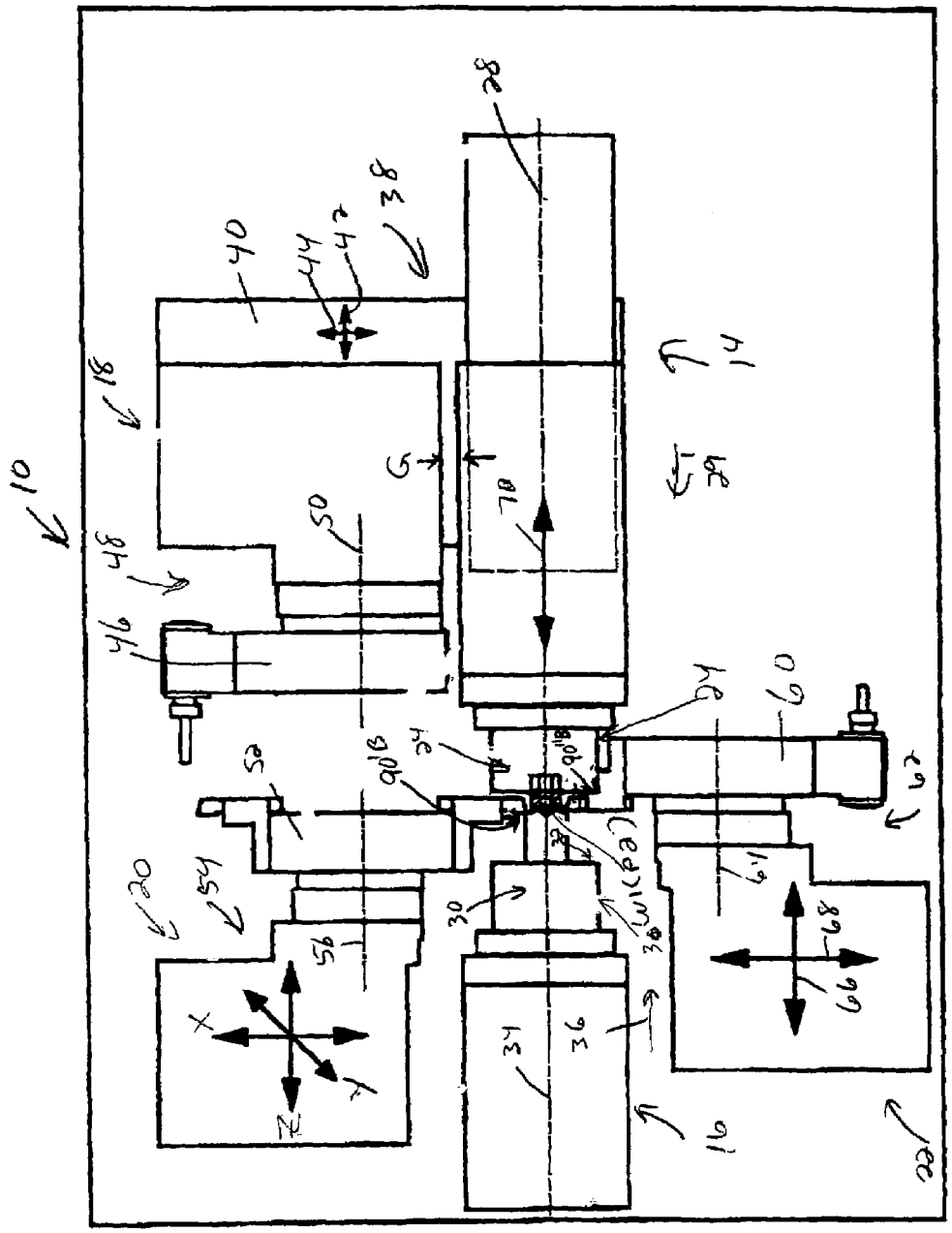

In FIG. 3, the workpiece W1 is identified as W1(P2) after being processed as shown in FIG. 2. In FIG. 3, the workpiece W1(P2) is chucked by the first and second spindles 24, 30, respectively. The first turret head 46 is indexed to the first angular position so as to create a gap G between the first turret assembly 48 and the first spindle headstock 14 so that they can be relatively overlapped along the first line/Z-axis without interference therebetween. This allows the first spindle headstock 14 to be advanced along the first line/Z-axis towards the workpiece W1(P2) chucked by the second spindle 30 so that the first spindle 24 can simultaneously chuck the workpiece W1(P2). The second turret head 52 and third turret head 60 can then be indexed to actively situate the cutting tools 90'B, 90"B, respectively thereon, operatively at the held workpiece W1(P2). By then simultaneously rotating the first and second spindles 24, 30, one or both of the cutting tools 90'B, 90"B, can be used to sever the moving workpiece W1 (P2). By reason of overlapping the first turret headstock 18 and first spindle headstock 14 along the first line/Z-axis, the first turret head 52 can be situated to perform the cutting operation as shown in FIG. 3 without interference from the first turret head 46. For the same reason, chucking of the workpiece W1(P2) by the first spindle 24 is made possible by the lack of interference between the first spindle headstock 14 and the first turret head 46.

Figure 4:
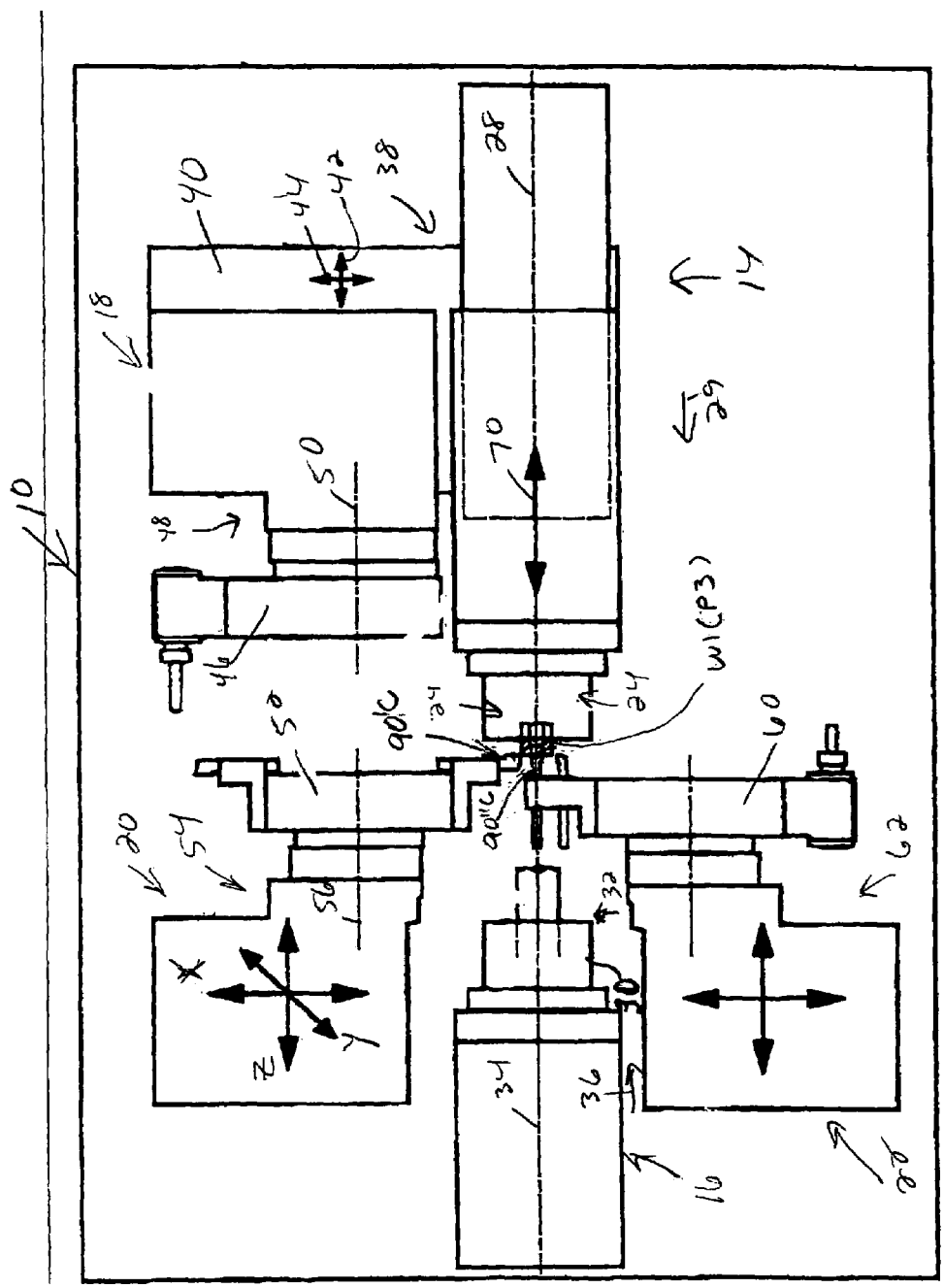

In FIG. 4, the workpiece W1 is identified as W1(P3), after being cut off in a process shown in FIG. 3 and held by the first spindle 24, which is thereafter moved away from the second spindle 30. This retracting movement of the first spindle 24 is accomplished by moving the base assembly 38 which thereby simultaneously shifts the first turret assembly 48 therewith. The first spindle headstock 14 may additionally be retracted relative to the base assembly to speed up the reconfiguration process. Backside processing of the workpiece W1(P3) can then be continued by rotating the first spindle 24 and utilizing a cutting tool 90'C and a cutting tool 90"C indexed to an operative position respectively by the second turret head 52 and the third turret head 60. The backside processing may take place immediately after the cutting operation described with respect to FIG. 3.

Figure 5:
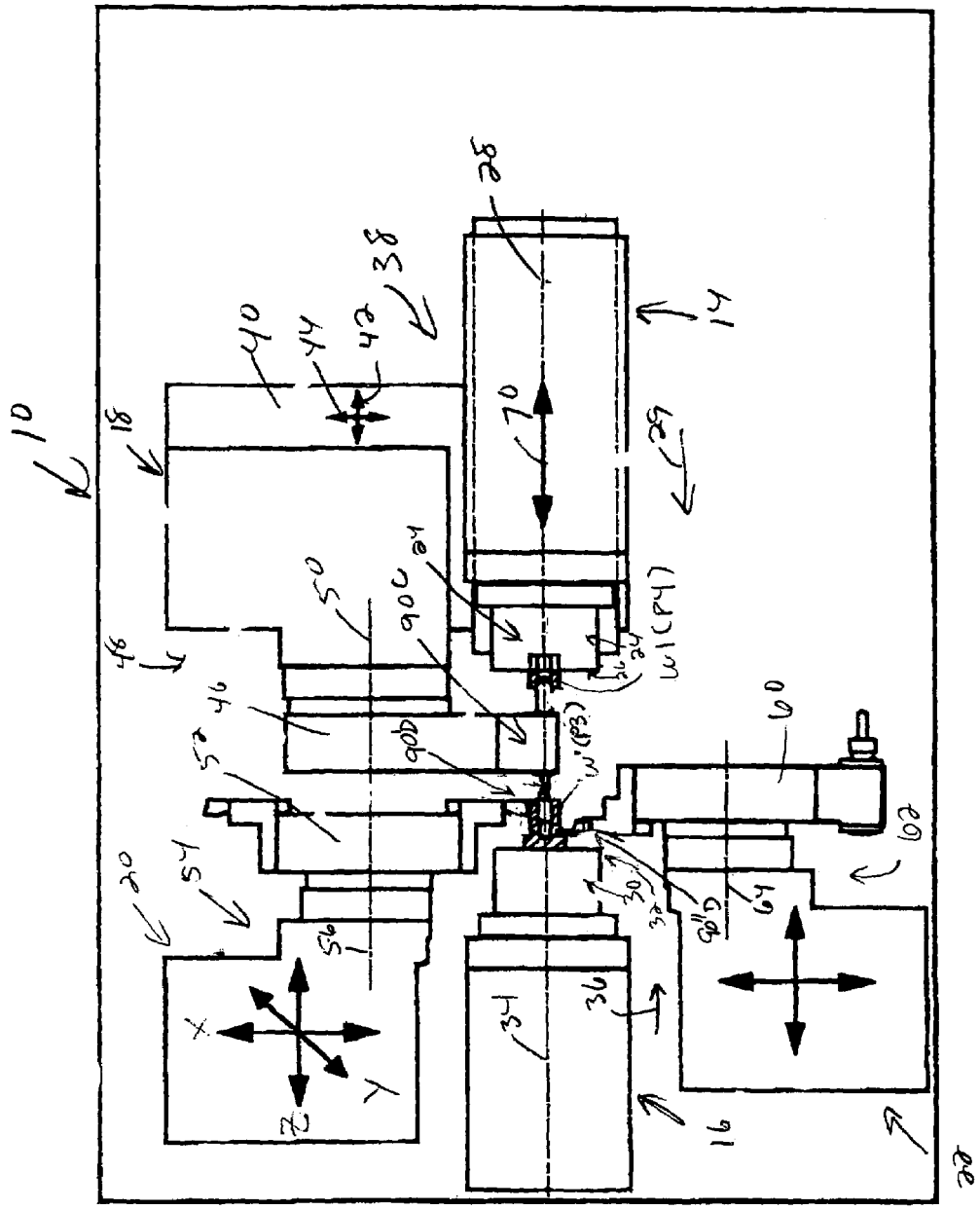

In FIG. 5, simultaneously operation on the workpiece W'(P3) which is the remaining portion of the workpiece W1 chucked in the second spindle 30 after processing as in FIG. 3, and the workpiece W1(P4), which is the workpiece W1 chucked by the first spindle 24 after processing as in FIG. 4. The workpiece W'(P3) is chucked and rotated by the second spindle 30 and simultaneously processed by tools 90'D, 90"D indexed to an active position respectively by the second turret head 52 and third turret head 60 and by a tool 90C on the first turret head 46. The workpiece W1(P4) chucked by the first spindle 24 is rotated and processed by the tool 90C carried by the first turret head 46.

To accomplish this, the base assembly 38 is shifted towards the left in FIG. 5 from the FIG. 4 position. The first spindle headstock 14 is shifted oppositely along the first line/Z-axis i.e. to the right relative to the base frame 40. As an example, back drilling may be performed by the tool 90C on the workpiece W1(P4). On the workpiece W'(P3) held by the second spindle 30, outside diameter turning operations may be performed by the tools 90'D, 90"D. At the same time, differential inside diameter machining may be performed on the workpiece W'(P3) by the tool 90C, utilizing the translatory movement of the first turret headstock 18 along the first line/Z-axis. All of the above described operations may be performed on the two workpieces W'(P3) and W1(P4) simultaneously.

Figure 6:
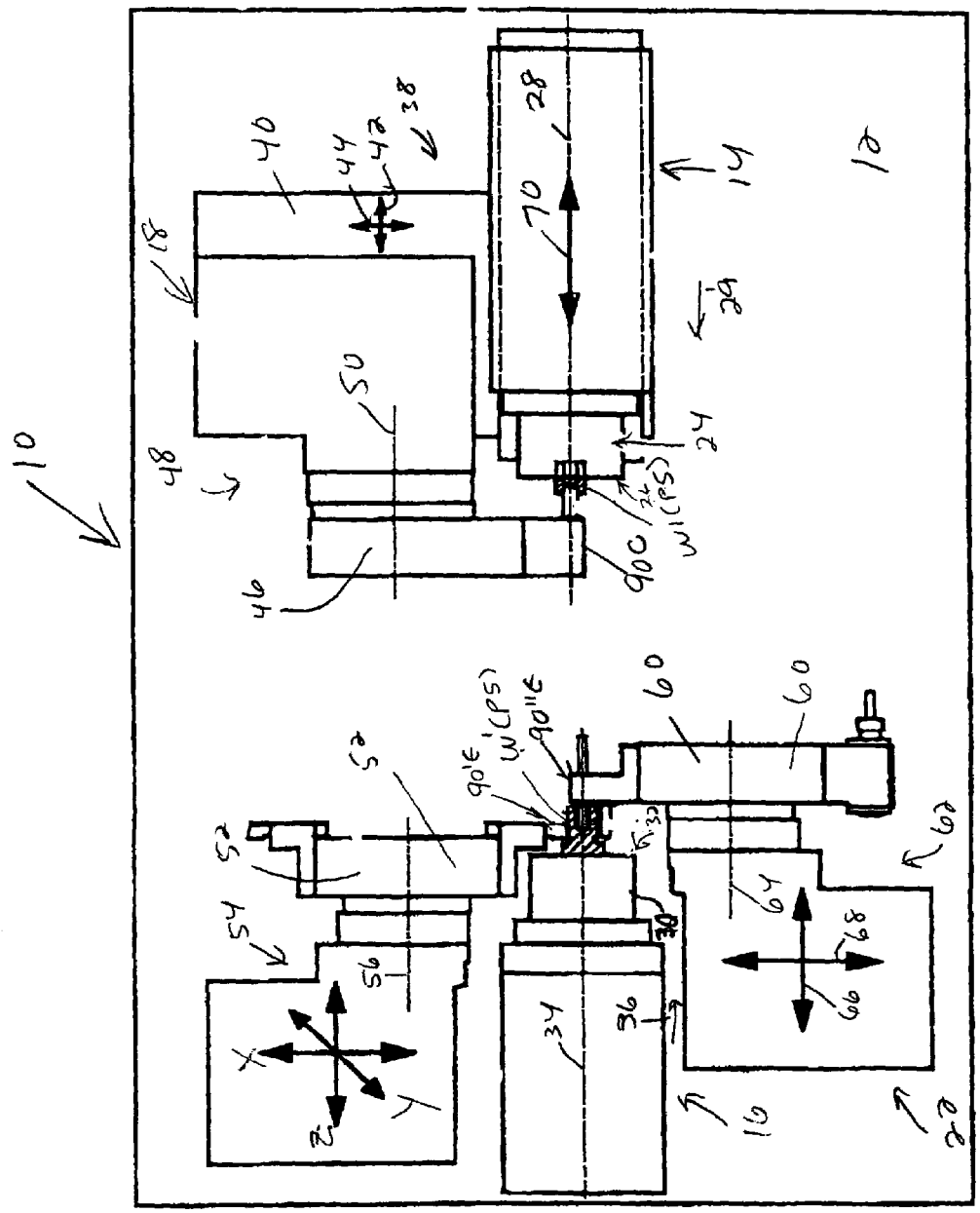

In FIG. 6, the workpiece, previously identified as W'(P3) in FIG. 5, is identified as W'(P5), after processing as in FIG. 5. The workpiece W1(P4) in FIG. 5 is identified in FIG. 6 as W1(P5), after processing as in FIG. 5.

To arrive at the FIG. 6 configuration, the base assembly 38 is shifted along the first line/Z-axis, to the right in FIG. 6 from the FIG. 5 position. In this configuration, the workpiece W'(P5) chucked by the second spindle 30 is processed on the outside diameter by a tool 90'E on the second turret head 52. A tool 90"E on the third turret head 60 performs inside diameter processing of the workpiece W1(P5) simultaneously with processing by the tool 90'E. The backside, inside diameter processing of the workpiece W1(P5) can be continued by the tool 90C on the first turret head 96 simultaneously as the workpiece W'(P5) is processed by the tool 90'E, 90"E.

The processing cycle time may be kept relatively short by simultaneously performing backside processing on the workpiece W1(P5) and simultaneous inside and outside diameter processing on the workpiece W'(P5).

Further, because the first spindle headstock 14 can be translated along the first line simultaneously as the base frame 40 is moved in the same direction along the first line, the benefit of the combined speed of movement along the first line can be exploited. It is possible to perform the backside processing on the workpiece W1(P5) without requiring complicated, simultaneous control of multiple machining components.

Figure 7:
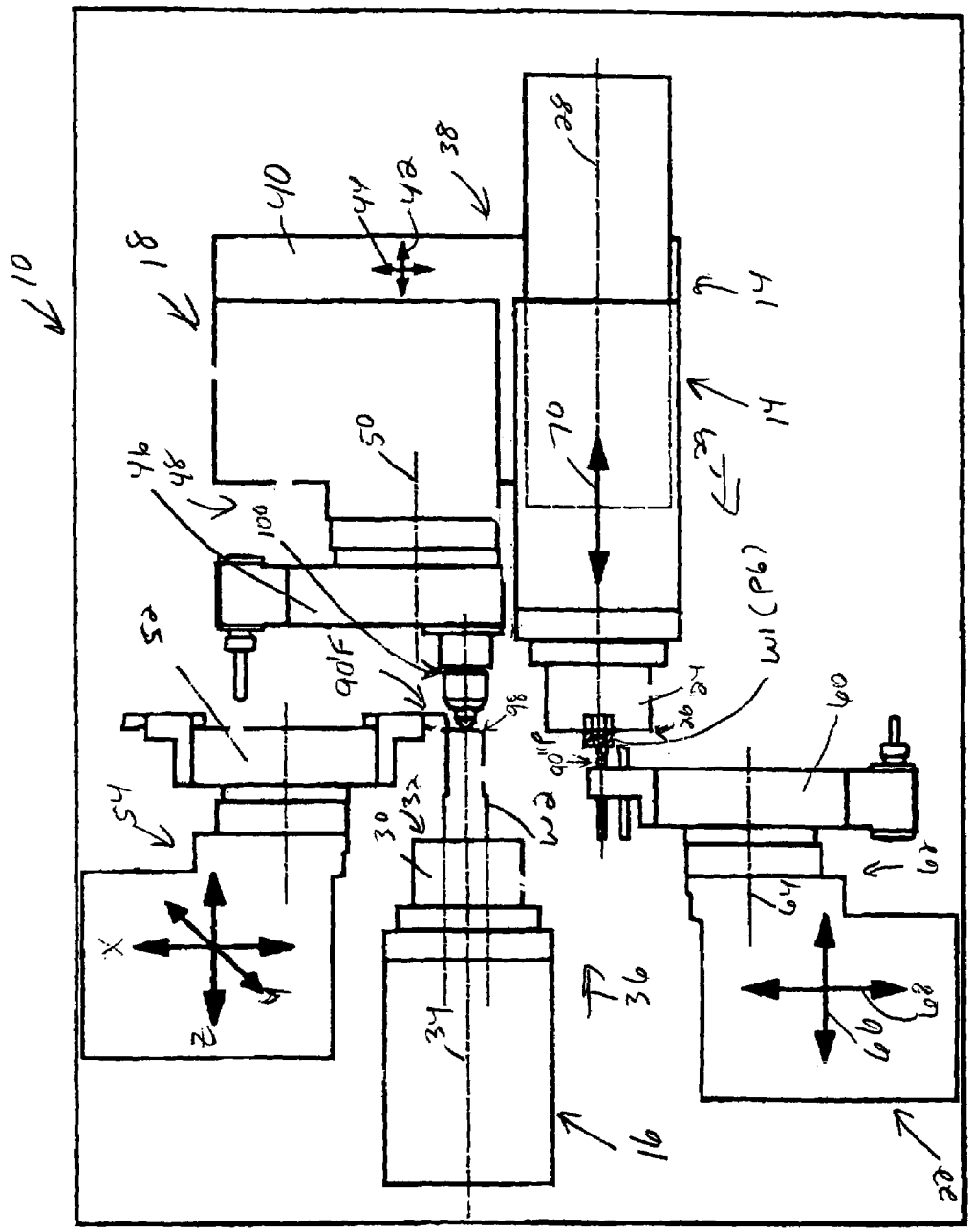

In FIG. 7, an additional configuration of the machine tool 10 is shown simultaneously operating on the previously processed workpiece W1(P5), identified as W1(P6) in FIG. 7 after processing as in FIG. 6, and a separate, elongate workpiece W2. In this configuration, the third turret assembly 62 and base assembly 38 are moved towards each other along the first line/Z-axis. Backside processing is performed on the workpiece W1(P6) chucked by the spindle 24 by a tool 90"F on the third turret head 60.

Simultaneously, front face processing is performed on the workpiece W2 by a tool 90'F on the second turret head 52, with the workpiece W2 chucked by the second spindle 30.

The free end 98 of the workpiece W2 is additionally supported by a subspindle 100 on the first turret head 46, with the first turret head 46 in the first angular position. The subspindle 100 stabilizes the workpiece W2 to avoid chattering thereof during operation.

By reason of placing the first turret head 46 in the first angular position, the first spindle headstock 14 is allowed to be moved relative to the first turret head 46 so that the first spindle 24 can chuck the workpiece W1(P6) situated to the left of the first turret head 46 in FIG. 7, and the subspindle 100 thereon, without any interference between these elements. Thus, the subspindle 100 and first spindle 24 are simultaneously useable for improved overall efficiency.

Figure 10:
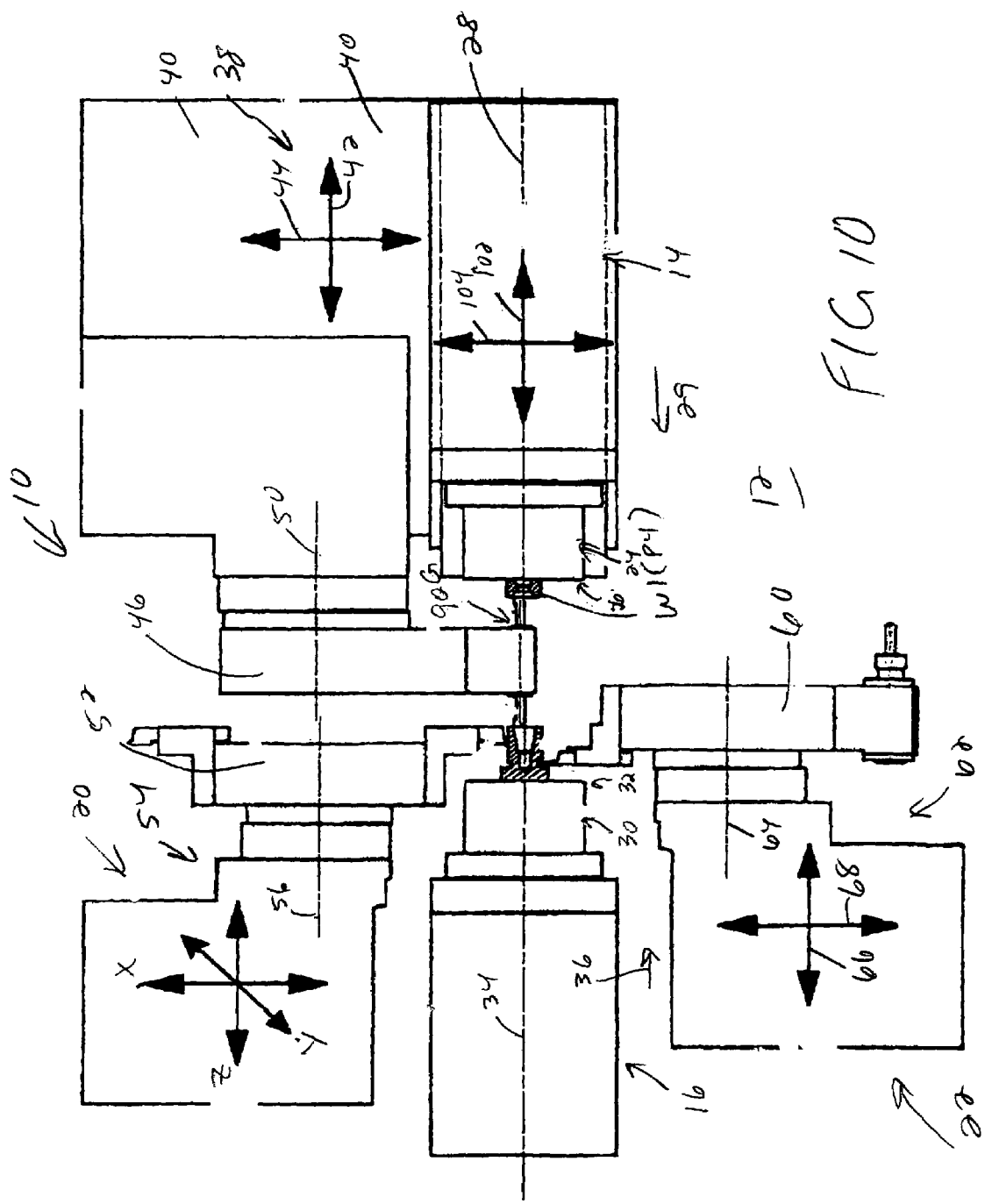
FIG. 10 is a view of a modified form of the machine tool shown in FIGS. 1–7 and incorporating a modification whereby the first spindle headstock has an additional degree of movement relative to the first turret assembly.

While the system operation, as described with respect to FIGS. 1–7 shows the first spindle headstock 14 to be movable only along the Z-axis, more preferably, as shown in FIGS. 10 and 11, the first spindle headstock 14 is movable relative to the base frame 40 translatingly along the second line/X-axis. As shown in FIG. 10, the first spindle headstock 14 is movable relative to the base frame 40 selectively along the first line/Z-axis and second line/X-axis, as indicated by the double-headed arrows 102, 104, respectively.

One mechanism for accomplishing the above described movement of the base frame 40 and between the first spindle headstock 14, base frame 40, and first spindle headstock 14 is shown in FIG. 11. The base frame/plate 40 is mounted upon the support 12. A ball screw assembly 112 is mounted to the base frame 40. The first rod 114 is threadably engaged wit the ball screw assembly 112 and driven by a motor 116 secured to the support 12. By operating the motor 116 selectively in forward and reverse directions, the base frame 40 can be selectively advanced through the ball screw assembly 112 along the first line/Z-axis, as indicated by the double-headed arrow 118.

The base frame 40 in turn carries second and third base plates 120, 122, which follow movement of the base frame 40 along the first line/Z-axis. The second base plate 120 supports the first turret headstock 18. A second ball screw assembly 124 is fixed to the second base plate 120 and threadably receives a second rod 126 driven by a motor 128 fixed to the base frame 40. By operating the motor, the rod 126 and second ball screw assembly 124 cooperate to selectively translate the second base plate 120 in opposite directions along the second line/X-axis, as indicated by the double-headed arrow 128.

The third base plate 122 in turn supports a fourth base plate 130. The first spindle headstock 14 is operatively mounted on the fourth base plate 130.

A third ball screw assembly 132 is attached to the third base plate 122 and cooperates with a threaded rod 134 driven by a motor 136 fixed to the second base plate 120. By operating the motor 136 selectively in opposite directions, the third base plate 122 can be translated relative to the second base plate 120 along the second line/X-axis, as indicated by the double-headed arrow 138, to thereby control the spacing between the first axis 50 and the central axis 28 of the first spindle headstock 14.

The fourth base plate 130, and the first spindle headstock 14 mounted thereon, are movable relative to the third base plate 122 in opposite directions along the first line/Z-axis, as indicated by the double-headed arrow 140. This is accomplished by utilizing a cooperating rod 142 and fourth ball screw assembly 144. The rod 142 is controllably driven by a motor 146 fixed to the third base plate 122.

With this arrangement, the base frame/plate 40 can be moved along the first line/Z-axis to simultaneously reposition the first turret assembly 48 and first spindle headstock 14. The first turret assembly 48 can be independently repositioned along the second line/X-axis relative to the base frame 40. The first turret assembly 48 and first spindle headstock 14 can be relatively repositioned along the second line/X-axis. The first spindle headstock 14 can be independently moved relative to the first turret assembly 48 along the first line/Z-axis. With the motor 136 stationary, the second base plate 120 and third base plate 122 move unitarily to be shifted along the second line/X-axis by the motor 128 and by the motor 116 along the first line/Z-axis.

By using the plate arrangement shown, multiple variations of movement between the first turret assembly 48 and first spindle headstock 14 are possible using a relatively low profile construction. This facilitates compact and efficient overall system design.

As shown in FIG. 10, using the FIG. 11 mechanism, another dimension of operation can be achieved compared to the corresponding setup shown in FIG. 5, absent this additional degree of movement. Because the first spindle headstock 14 can move along the second line/X-axis, typically up to a distance of 30 mm, not only drilling operations may be performed, but also inside and outside diameter turning operations become possible with the workpiece W1(P4) chucked by the first spindle 24 of the first spindle headstock 14, using the tool 90G on the first turret head 46.

As previously noted, there are a number of advantages afforded by the inventive structure. As one example, the combined movement of the base frame 40 along the first line/Z-axis, combined with the movement of the first spindle headstock 14 in the same direction relative to the base frame 40, allows compounding of the resultant movement of the first spindle headstock 14 relative to the other system components, such as the second turret assembly 54, third turret assembly 62, and second spindle headstock 16. This construction potentially introduces cost savings in the system design and may require a lesser degree of complexity to coordinate operation of the system components. Conventional systems may utilize independent machining components that require a complex scheme of coordination. Potentially complex combinations of machining operations can be performed, using the present invention, without the generally required complex coordination of separate components in the prior art. This may be particularly true in the case of backside machining on a workpiece wherein, for example, the first spindle headstock 14 and first turret assembly 48 are relatively moved as they are moved in unison through the base frame 40.

Additionally, by utilizing the sliding movement of the first turret assembly 48 and first spindle headstock 14, differential inside and outside diameter machining is made possible.

The foregoing disclosure of specific embodiments is intended to be illustrative of the broad concepts comprehended by the invention.

The invention claimed is:

1. A machine tool assembly comprising:
   a base assembly movable relative to a support selectively a) oppositely parallel to a first line, and b) oppositely parallel to a second line that is orthogonal to the first line;
   a first spindle headstock movable with the base assembly and having a central axis extending parallel to the first line and a working end; and
   a first turret assembly movable with the base assembly and comprising a first turret headstock and a first turret head that is movable around a first axis relative to the first turret headstock,
   the first turret head movable selectively into first and second different angular positions around the first axis relative to the first turret headstock,
   the first turret head and first spindle headstock movable relative to each other parallel to the first line in a manner that the first turret head can move up to and past the working end of the first spindle headstock without interference between the first spindle headstock and first turret assembly with the first turret assembly and first spindle headstock in a first relative state,
   the first turret assembly and first spindle headstock situated so as to interfere with each other as the first turret assembly and first spindle headstock are moved relative to each other parallel to the first line in a manner that the first turret head moves up to the working end of the first spindle headstock with the first turret assembly and first spindle headstock in a second relative state.

2. The machine tool assembly according to claim 1 wherein with the first turret assembly and first spindle headstock in the first relative state, the first turret head is in the first angular position, and with the first turret assembly and first spindle headstock in the second relative state, the first turret head is in the second angular position.

3. The machine assembly according to claim 1 wherein the central axis of the first spindle headstock is spaced further from the first axis with the first turret assembly and first spindle headstock in the first relative state than with the first turret assembly and first spindle headstock in the second relative state.

4. The machine tool assembly according to claim 2 wherein the first turret head projects a first distance from the first axis toward the first spindle headstock with the first turret head in the first angular position and the first turret head projects a second distance from the first axis toward the first spindle headstock with the first turret head in the second angular position, and the first distance is less than the second distance.

5. The machine tool assembly according to claim 1 wherein the base assembly comprises a base frame which is movable as one piece parallel to the first and second lines, the first turret headstock is fixedly attached to the base frame, and the first spindle headstock is mounted to the base frame for movement relative to the base frame parallel to the first line.

6. The machine tool assembly according to claim 2 wherein the first turret head has an outer circumference from which a plurality of circumferentially spaced tools project and the first turret head has a circumferential void between adjacent tools defining a receptacle to accommodate at least a part of the first spindle headstock.

7. The machine tool assembly according to claim 2 wherein the first turret head is generally V-shaped as viewed from a perspective along the first axis.

8. The machine tool assembly according to claim 2 wherein the first turret head is generally V-shaped opening away from an apex as viewed from a perspective along the first axis and the apex is adjacent to the first axis.

9. The machine tool assembly according to claim 8 wherein the first axis resides within the V defined by the V-shaped first turret head.

10. The machine tool assembly according to claim 1 wherein the first spindle headstock and first turret head are movable selectively toward and away from each other parallel to the second line.

11. The machine tool assembly according to claim 1 wherein the first spindle headstock and first turret headstock are movable selectively toward and away from each other parallel to the first line.

12. The machine tool assembly according to claim 11 wherein with the first turret head and working end of the first spindle headstock overlapping along the first line, the first spindle headstock and first turret headstock can be moved closer to each other parallel to the second line with the first turret head in the first angular position than with the first turret head in the second angular position.

13. The machine tool assembly according to claim 1 further comprising a) a second spindle headstock with a central axis extending parallel to the first line, the first spindle headstock facing a first direction along the central axis of the first spindle headstock, the second spindle headstock facing oppositely to the first direction along the central axis of the second spindle headstock, the first and second spindle headstocks facing each other, and b) a second turret assembly comprising a second turret headstock and a second turret head, the second turret head facing oppositely to the first direction and movable selectively oppositely parallel to the first and second lines, the first turret head facing the first direction, the base assembly spaced from the second spindle headstock in a direction oppositely to the first direction.

14. The machine assembly according to claim 13 wherein with the first turret assembly and first spindle headstock in the first relative state, the first turret head is in the first angular position, and with the first turret assembly and first spindle headstock in the second relative state, the first turret head is in the second angular position.

15. The machine assembly according to claim 13 wherein the central axis of the first spindle headstock is spaced further from the first axis with the first turret assembly and first spindle headstock in the first relative state than with the first turret assembly and first spindle headstock in the second relative state.

16. The machine tool assembly according to claim 14 wherein the first turret head projects a first distance from the first axis toward the first spindle headstock with the first turret head in the first angular position and the first turret head projects a second distance from the first axis toward the first spindle headstock with the first turret head in the second angular position, and the first distance is less than the second distance.

17. The machine tool assembly according to claim 14 wherein the base assembly comprises a base frame which is movable as one piece parallel to the first and second lines, the first turret headstock is fixedly attached to the base frame, and the first spindle headstock is mounted to the base frame for movement relative to the base frame parallel to the first line.

18. The machine tool assembly according to claim 14 wherein the first turret head has an outer circumference from which a plurality of circumferentially spaced tools project and the first turret head has a circumferential void between adjacent tools defining a receptacle to accommodate at least a part of the first spindle headstock.

19. The machine tool assembly according to claim 14 wherein the first turret head is generally V-shaped as viewed from a perspective along the first axis.

20. The machine tool assembly according to claim 14 wherein the first turret head is generally V-shaped opening away from an apex as viewed from a perspective along the first axis and the apex is adjacent to the first axis.

21. The machine tool assembly according to claim 20 wherein the first axis resides within the V defined by the V-shaped first turret head.

22. The machine tool assembly according to claim 13 wherein the first spindle headstock and first turret head are movable selectively toward and away from each other parallel to the second line.

23. The machine tool assembly according to claim 13 wherein the first spindle headstock and first turret headstock are movable selectively toward and away from each other parallel to the first line.

24. The machine tool assembly according to claim 23 wherein with the first turret head and working end of the first spindle headstock overlapping along the first line, the first spindle headstock and first turret headstock can be moved closer to each other parallel to the second line with the first turret head in the first angular position than with the first turret head in the second angular position.

25. The machine tool assembly according to claim 13 wherein the second turret head is movable around a second axis relative to the second turret headstock and further comprising a third turret assembly comprising a third turret headstock and a third turret head, the third turret head movable around a third axis relative to the third headstock, the central axis of the second spindle headstock residing between the second and third axes.

26. The machine assembly according to claim 25 wherein with the first turret assembly and first spindle headstock in the first relative state, the first turret head is in the first angular position, and with the first turret assembly and first spindle headstock in the second relative state, the first turret head is in the second angular position.

27. The machine assembly according to claim 25 wherein the central axis of the first spindle headstock is spaced further from the first axis with the first turret assembly and first spindle headstock in the first relative state than with the first turret assembly and first spindle headstock in the second relative state.

28. The machine tool assembly according to claim 25 wherein the third turret headstock is selectively movable oppositely parallel to the first and second lines.

29. The machine tool assembly according to claim 28 wherein the third turret headstock faces oppositely to the first direction.

30. The machine tool assembly according to claim 26 wherein the first turret head projects a first distance from the first axis toward the first spindle headstock with the first turret head in the first angular position and the first turret head projects a second distance from the first axis toward the first spindle headstock with the first turret head in the second angular position, and the first distance is less than the second distance.

31. The machine tool assembly according to claim 29 wherein the base assembly comprises a base frame which is movable as one piece parallel to the first and second lines, the first turret headstock is fixedly attached to the base frame, and the first spindle headstock is mounted to the base frame for movement relative to the base frame parallel to the first line.

32. The machine tool assembly according to claim 26 wherein the first turret head has an outer circumference from which a plurality of circumferentially spaced tools project and the first turret head has a circumferential void between adjacent tools defining a receptacle to accommodate at least a part of the first spindle headstock.

33. The machine tool assembly according to claim 26 wherein the first turret head is generally V-shaped as viewed from a perspective along the first axis.

34. The machine tool assembly according to claim 26 wherein the first turret head is generally V-shaped opening away from an apex as viewed from a perspective along the first axis and the apex is adjacent to the first axis.

35. The machine tool assembly according to claim 34 wherein the first axis resides within the V defined by the V-shaped first turret head.

36. The machine tool assembly according to claim 29 wherein the first spindle headstock and first turret head are movable selectively toward and away from each other parallel to the second line.

37. The machine tool assembly according to claim 36 wherein the first spindle headstock and first turret headstock are movable selectively toward and away from each other parallel to the first line.

38. The machine tool assembly according to claim 36 wherein with the first turret head and working end of the first spindle headstock overlapping along the first line, the first spindle headstock and first turret headstock can be moved closer to each other parallel to the second line with the first turret head in the first angular position than with the first turret head in the second angular position.

39. A turret assembly comprising:

a turret headstock; and a turret head that is movable guidingly relative to the turret headstock around an axis, the turret head having an outer circumference from which a plurality of tools project, wherein the turret head has a V-shaped portion as viewed from a perspective along the axis with an apex and first and second legs projecting angularly away from the apex, the first leg defined at one of the plurality of tools and the second leg defined at a second of the plurality of tools, wherein the plurality of tools on the turret head reside within the V and there is a circumferential void outside of the V opening into which a machine tool component can be radially directed relative to the axis, and there are no tools on the turret head outside of the V.

40. The turret assembly according to claim 39 wherein the turret head is generally V-shaped opening away from the apex as viewed from a perspective along the axis and the apex is adjacent to the axis.

41. The turret assembly according to claim 39 wherein the axis resides within the V defined by the V-shaped turret head.

42. The turret assembly according to claim 39 in combination with a spindle headstock capable of holding a workpiece to be processed by a tool held by the turret head and the spindle headstock and turret head are relatively movable between a state wherein the spindle headstock resides at least partially within the receptacle and a state wherein the spindle headstock does not reside within the receptacle.

43. The turret assembly according to claim 39 wherein the axis resides within the V.

* * * * *